W. H. FRAMPTON.
VISES FOR CARPENTERS' BENCHES.
No. 187,117. Patented Feb. 6, 1877.
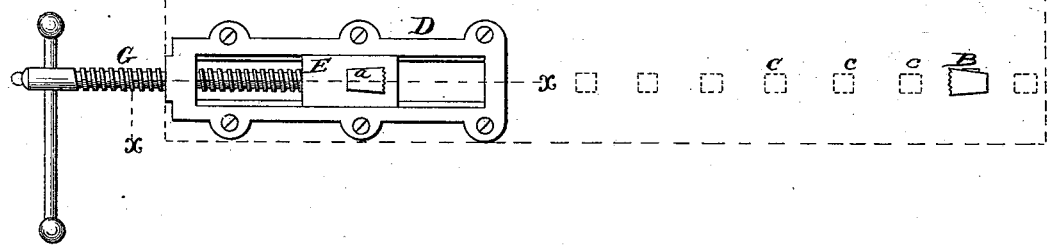
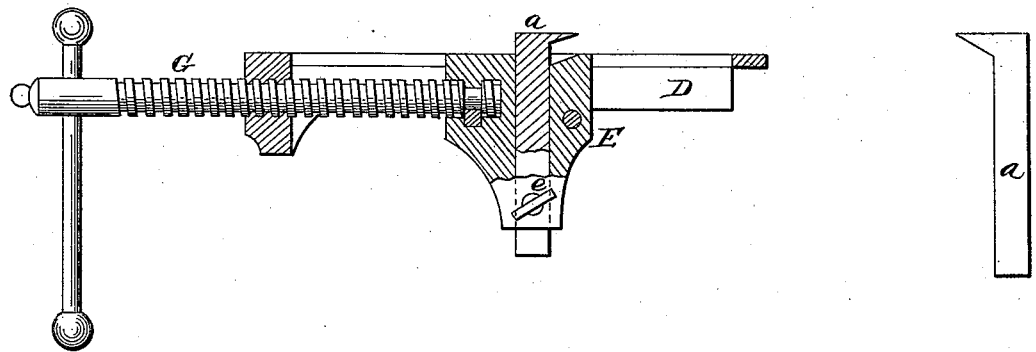
WITNESSES
Henry N. Miller
Franck L. Ourand
INVENTOR
Wm. H. Frampton,
Alexander Mason
ATTORNEYS

UNITED STATES PATENT OFFICE.

WILLIAM H. FRAMPTON, OF TOPEKA, KANSAS.

IMPROVEMENT IN VISES FOR CARPENTERS' BENCHES.

Specification forming part of Letters Patent No. 187,117, dated February 6, 1877; application filed September 9, 1876.

*To all whom it may concern:*

Be it known that I, WILLIAM H. FRAMPTON, of Topeka, in the county of Shawnee, and in the State of Kansas, have invented certain new and useful Improvements in Vises for Carpenters' Benches; and do hereby declare that the following is a full, clear, and exact description thereof, reference being had to the accompanying drawings, and to the letters of reference marked thereon, making a part of this specification.

The nature of my invention consists in the arrangement, with a carpenter's bench, of a metallic frame, in which is placed a sliding box which carries an adjustable dog for the purpose of holding boards or pieces of timbers while being worked upon, as will be hereinafter set forth.

In the accompanying drawings, making part of this specification, Figure 1 represents a plan view, and Fig. 2 a section of the frame and box.

In the figures, A represents the top of a carpenter's bench, which is provided with a series of holes, c c c, in one of which is inserted a dog, B. D represents a metallic frame, which is provided with a series of ears, through which screws pass to secure it to the top of the bench. An opening is cut in the top, so as to allow the frame to be set down in it until its upper surface is flush with the table-top. This frame is provided with a rectangular opening lengthwise of it, and in this opening, and resting upon ways in it, is placed a sliding metallic box, E. This box E has an opening made vertically through it, and inserted in this opening is a dog, a. This dog is held in any desired position in the box by means of a set-screw, e. G represents a screw which passes through a female screw in one end of the frame D, and which has its inner end connected loosely to the sliding box E. By turning the screw G the box E is moved backward or forward in the frame.

It will be seen that the metallic box E extends down below the under surface of the frame D and under the bottom of the bench, so that when the dog is inserted in the vertical slot in the box it is perfectly guided, and it can be rigidly held at any suitable height by means of the set-screw, or it can be readily removed from the frame at will.

I am aware that a bench-vise composed of a metallic frame having a dog connected to a sliding block operated by means of a screw is not new; hence I do not broadly claim such as my invention. In the device referred to above the dog has an extension from which a guide-pin extends through the sliding block, while the dog is raised and lowered by a connected screw from underneath. In my invention the dog is of ordinary construction, to be applied anywhere in the bench, and is held in the slot in the extended box by a set-screw.

It will readily be seen that when a board or piece of timber is placed upon the bench the dog B may be inserted in the hole nearest to its end, and that by turning the screw the box can be moved up toward the timber until the dog a engages with it.

By means of the screw the teeth of both dogs can be pressed into the wood at each end of the plank, thus holding it firmly in position while being worked.

Having thus fully described my invention, what I claim as new, and desire to secure by Letters Patent, is—

The extended sliding box E, having a vertical slot, into which is inserted the dog a, and held by the set-screw, in combination with the screw G connected to the box E, and the slotted frame D provided with ears and ways, all substantially as and for the purposes herein set forth.

In testimony that I claim the foregoing I have hereunto set my hand this 26th day of August, 1876.

WILLIAM H. FRAMPTON.

Witnesses:
D. H. FORBES,
J. W. BAIRD.